United States Patent
Krishnan et al.

(10) Patent No.: US 9,225,636 B2
(45) Date of Patent: Dec. 29, 2015

(54) METHOD AND APPARATUS FOR EXCHANGING IP PACKETS AMONG NETWORK LAYER 2 PEERS

(71) Applicant: Telefonaktiebolaget L M Ericsson (publ), Stockholm (SE)

(72) Inventors: Suresh Krishnan, Montreal (CA); Geoffrey Lefebvre, Montreal (CA)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 441 days.

(21) Appl. No.: 13/856,971

(22) Filed: Apr. 4, 2013

(65) Prior Publication Data

US 2014/0301391 A1    Oct. 9, 2014

(51) Int. Cl.
*H04L 12/721* (2013.01)
*G06F 9/455* (2006.01)
*H04L 29/12* (2006.01)

(52) U.S. Cl.
CPC ............ *H04L 45/66* (2013.01); *G06F 9/45558* (2013.01); *H04L 61/2596* (2013.01); *G06F 2009/45595* (2013.01); *H04L 61/103* (2013.01)

(58) Field of Classification Search
CPC .... H04L 45/66; H04L 61/103; H04L 61/2596
See application file for complete search history.

(56) References Cited

U.S. PATENT DOCUMENTS

| | | | |
|---|---|---|---|
| 8,259,593 B2 * | 9/2012 | Baker et al. | 370/245 |
| 2008/0008182 A1 | 1/2008 | Deng | |
| 2008/0186965 A1 | 8/2008 | Zheng et al. | |
| 2011/0238975 A1 * | 9/2011 | Amemiya et al. | 713/150 |
| 2013/0136140 A1 * | 5/2013 | Tanimoto | 370/409 |

OTHER PUBLICATIONS

Unknown, Author, "Understanding PBB—Knowledge Base", Retrieved from the Internet: https://web.archive.org/web/20120101181717/http://sites.google.com/site/amitscis/cozone/home/pbb/understanding-pbb on Jul. 7, 2014, Jan. 1, 2012, 1-4.

(Continued)

*Primary Examiner* — Mark Rinehart
*Assistant Examiner* — Gbemileke Onamuti
(74) *Attorney, Agent, or Firm* — Murphy, Bilak & Homiller, PLLC

(57) ABSTRACT

In one aspect, the teachings herein provide point-to-point communication between all the virtual machines (VMs) belonging to the same tenant in a cloud-based virtual network environment without using any intermediate routing functions, and while providing full virtualization at the L2 and L3 levels. That is, the approach preserves completely isolated address spaces for each tenant at both L2 and L3 levels and supports multiple subnets for each tenant, and thereby allows tenants to define their own virtual networks without requiring the addition of expensive centralized routing and without requiring inter-subnet communications for the same tenant to traverse sub-optimal paths, as happens with software-based routers implemented in one of the VMs belonging to the tenant. Moreover, the methods and apparatuses taught herein provide a distributed solution for communicating between subnets belonging to the same virtual or logical network, thereby avoiding single-point-of-failure issues and offering improved scalability.

14 Claims, 8 Drawing Sheets

(56) References Cited

OTHER PUBLICATIONS

Dacey, A. "How ARP Works." Frügal. Web. Mar. 5, 2013. http://www.tildefrugal.net/tech/arp.php.

Unknown, Author. "Hypervisor." Wikipedia: The Free Encyclopedia. Wikimedia Foundation, Inc. Feb. 25, 2013. Web. Mar. 6, 2013. http://en.wikipedia.org/wiki/Hypervisor.

* cited by examiner

METHOD AND APPARATUS FOR EXCHANGING IP PACKETS AMONG NETWORK LAYER 2 PEERS

TECHNICAL FIELD

The present invention generally relates to data networks, and particularly relates to exchanging IP packets between L2 peers in such networks.

BACKGROUND

The emergence of cloud computing has resulted in the design and construction of large datacenters where multiple tenants are migrating complex applications that were once hosted in private enterprise networks. One of the most important enablers for this migration is system virtualization, which allows multiple servers, potentially belonging to different tenants, to be hosted on the same physical host. These servers, contained in virtual machines or VMs, can be transparently migrated between physical hosts without any noticeable disruption, providing a flexibility and elasticity to the cloud operators. In order to maximize this flexibility, an operator should be able to migrate a VM between different links in the data centers without being restricted by the topology of the interconnections.

Additionally, tenants typically would like to manage their own networks using their own addressing plans and ranges, thus easing the migration from their private datacenter into the cloud. Any network virtualization solution should provide isolation at the addressing level between different virtual networks while still maintaining the ability to forward traffic between the individual subnets belonging to the same tenant.

Most of the existing network virtualization solutions meet these requirements by creating overlays—either Layer 2 (L2) or Layer 3 (L3)—on top of a physical network. L2 solutions such as Shortest Path Bridge (SPB) and Transparent Interconnection of Lots of Links (Trill) encapsulate tenant traffic into outer L2 tunnels (a MAC header plus an additional header). L2 solutions are limited to a single L2 domain, although this domain can be quite large due to the use of a routing protocol between switches instead of relying on learning and flooding to populate forwarding tables. L3 solutions such as VxLAN and Network Virtualization using Generic Routing Encapsulation (NVGRE) use IP based tunnels. L3 solutions do not suffer from the scalability limitations associated with L2-based solutions but they do impose additional overhead because of the larger encapsulating headers.

Although the previously mentioned solutions allow the creation of per tenant isolated virtual networks, these networks are flat single L2 domains, i.e., one IP subnet. Such solutions do not address the need for tenants to subdivide their virtual network into different subnets and the problem of routing between different virtual subnets belonging to the same tenant.

Routing between different subnets in a virtualized network may be handled using a virtual-network router at a L3 gateway within the datacenter. This solution, however, requires significant routing capability at the L3 gateway—a conservative estimate is that four times the traffic flows through the router in this case. FIG. 1 illustrates communications between VMs using L3 gateway routing.

One sees a datacenter network 10 having L2 switches 12 and L3 routers 14 at the L3 gateway level. Servers 16 host any number of VMs, with VM1-VM4 illustrated by way of example. VM1 and VM4 operate in one subnet communication through respective ones of the L2 switches 12. The same is true for VM2 and VM3, which operate in another subnet. However, because communications between VM1 and VM3 involve different subnets, communications between VM1 and VM3 are routed through the L3 gateway via respective ones of the L3 routers 14.

FIG. 2 illustrates another known approach that involves designating certain VMs as software-based routers and default gateways for the virtual-network subnets to which they are attached. One sees a software router "R" implemented in one of the servers 16 according to such a configuration. While this approach lowers cost, it also introduces choke points in the network, because the traffic between subnets is limited by the link provided to a single VM.

SUMMARY

In one aspect, the teachings herein provide point-to-point communication between all the virtual machines (VMs) belonging to the same tenant in a cloud-based virtual network environment without using any intermediate routing functions, and while providing full virtualization at the L2 and L3 levels. That is, the approach preserves completely isolated address spaces for each tenant at both L2 and L3 levels and supports multiple subnets for each tenant, and thereby allows tenants to define their own virtual networks without requiring the addition of expensive centralized routing and without requiring inter-subnet communications for the same tenant to traverse sub-optimal paths, as happens with software-based routers implemented in one of the VMs belonging to the tenant. Moreover, the methods and apparatuses taught herein provide a distributed solution for communicating between subnets belonging to the same virtual or logical network, thereby avoiding single-point-of-failure issues and offering improved scalability.

In an example embodiment, a method of exchanging IP packets between different subnets comprises receiving an IP packet from a first host, e.g., a first VM, in a first subnet of a logical network having different subnets with a L2 connection between them. The IP packet is received at a first L2 gateway in the first subnet and the method includes the gateway determining that the IP packet targets a second host in a second subnet within the same logical network.

The method further includes obtaining a physical address for a second L2 gateway in the second subnet and a physical address for the second host, and further includes modifying the IP packet at the first L2 gateway to obtain a modified IP packet. Packet modifications include changing a source physical address in the IP packet from a physical address of the first host to the physical address obtained for the second L2 gateway, and changing a destination physical address from a physical address of the first L2 gateway to the physical address obtained for the second host. The method continues with generating a L2 protocol data unit (PDU) at the L2 gateway and sending the PDU on the L2 connection, for receipt at the second L2 gateway. The PDU comprises header information that includes a source physical address corresponding to the first L2 gateway, a destination physical address corresponding to the second L2 gateway, an organizational identifier (OID) for the logical network, and a payload comprising the modified IP packet.

In an example case, the first and second hosts are first and second virtual machines (VMs), the first and second subnets are first and second virtual subnets, and the logical network comprises a virtual network that includes the first and second virtual subnets. Further in the example case, the first L2 gateway is implemented in a first hypervisor that virtualizes the first VM and runs on a first physical host. Similarly, the second L2 gateway comprises a second hypervisor that virtualizes the second VM and runs on a second physical host.

In this context, a "hypervisor" is computer software, firmware and/or hardware that creates, runs and supervises VMs, which may also be referred to as "guest machines." As those of ordinary skill in the art will appreciate, the hypervisor virtualizes one or more VMs or guest machines on top of the same hardware/software resources and manages resource sharing between the VMs in a manner that is transparent to the VMs. That is, each VM appears to have host processing and memory resources all to itself.

The foregoing method also may include the complementary receive-side operations carried out at the second L2 gateway. In an example, the method further includes receiving the PDU at the second L2 gateway, extracting the modified IP packet from the PDU, and forwarding the modified IP packet to the second host, according to the destination physical address included in the modified IP packet. Advantageously, the receive-side aspects of the method for the second L2 gateway using the OID are included in the PDU to disambiguate the destination physical address included in the modified IP packet. That is, the OID acts as "tenant identifier" in some sense, to facilitate inter-subnet communications between different subnets belonging to the same tenant or organization.

The above method is implemented, for example in an L2 gateway comprising first and second interfaces and a processing circuit operatively associated with them. The first interface is configured for data communications in a first subnet of a logical network having different subnets with a L2 connection between them, and the second interface is configured for data communications via the L2 connection with a second L2 gateway in a second subnet of the logical network. The processing circuit is configured, e.g., based on the execution of computer program instructions stored in memory or another computer-readable medium, to carry out the send and/or receive side of the example method described above. In at least one embodiment, the contemplated L2 gateway comprises a functional entity within a physical host—i.e., the L2 gateway is realized within the processing and memory resources of the physical host.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
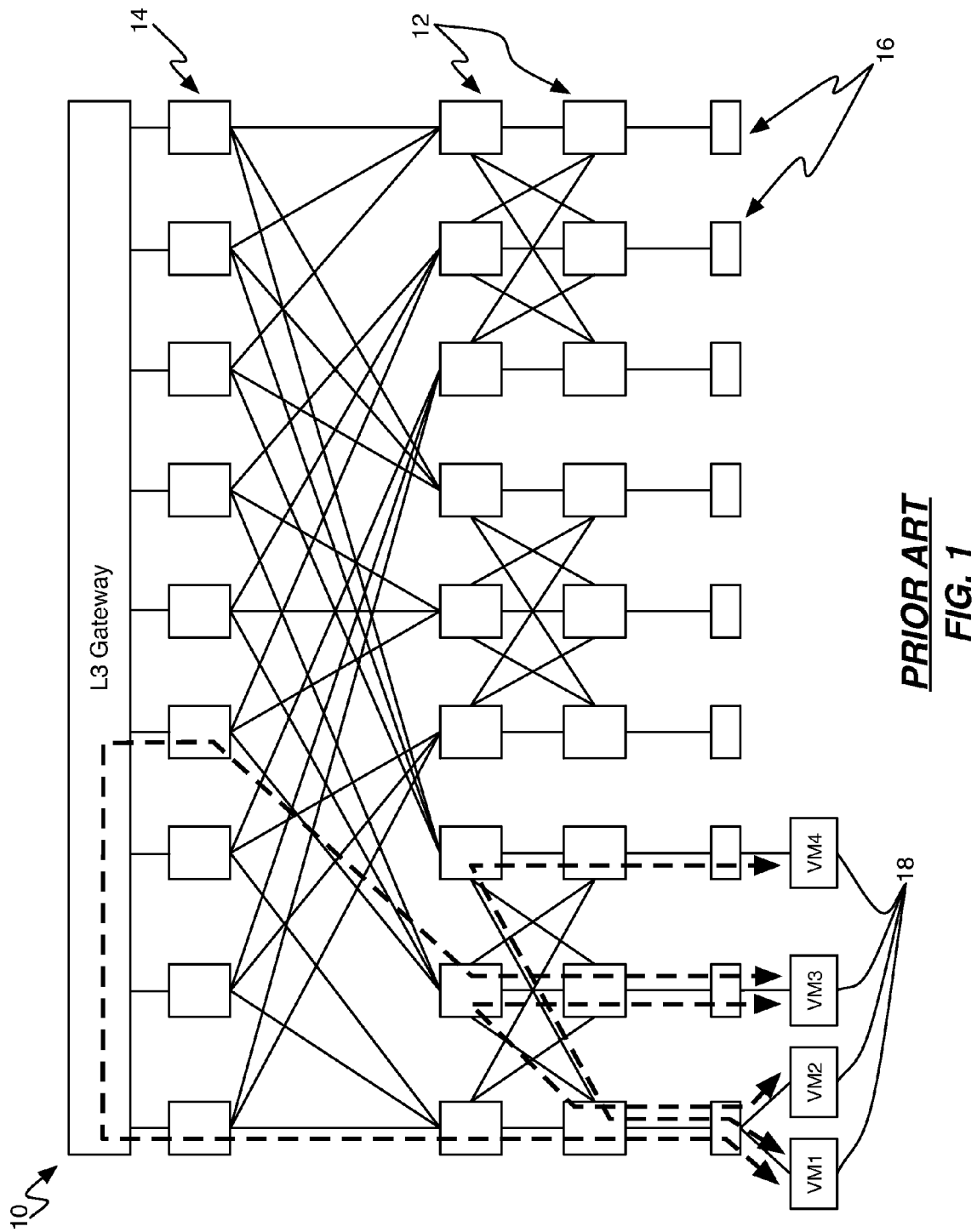
FIGS. 1 and 2 are diagrams of known network topologies and Layer 3 (L3) based routing between different subnets.
Figure 2:
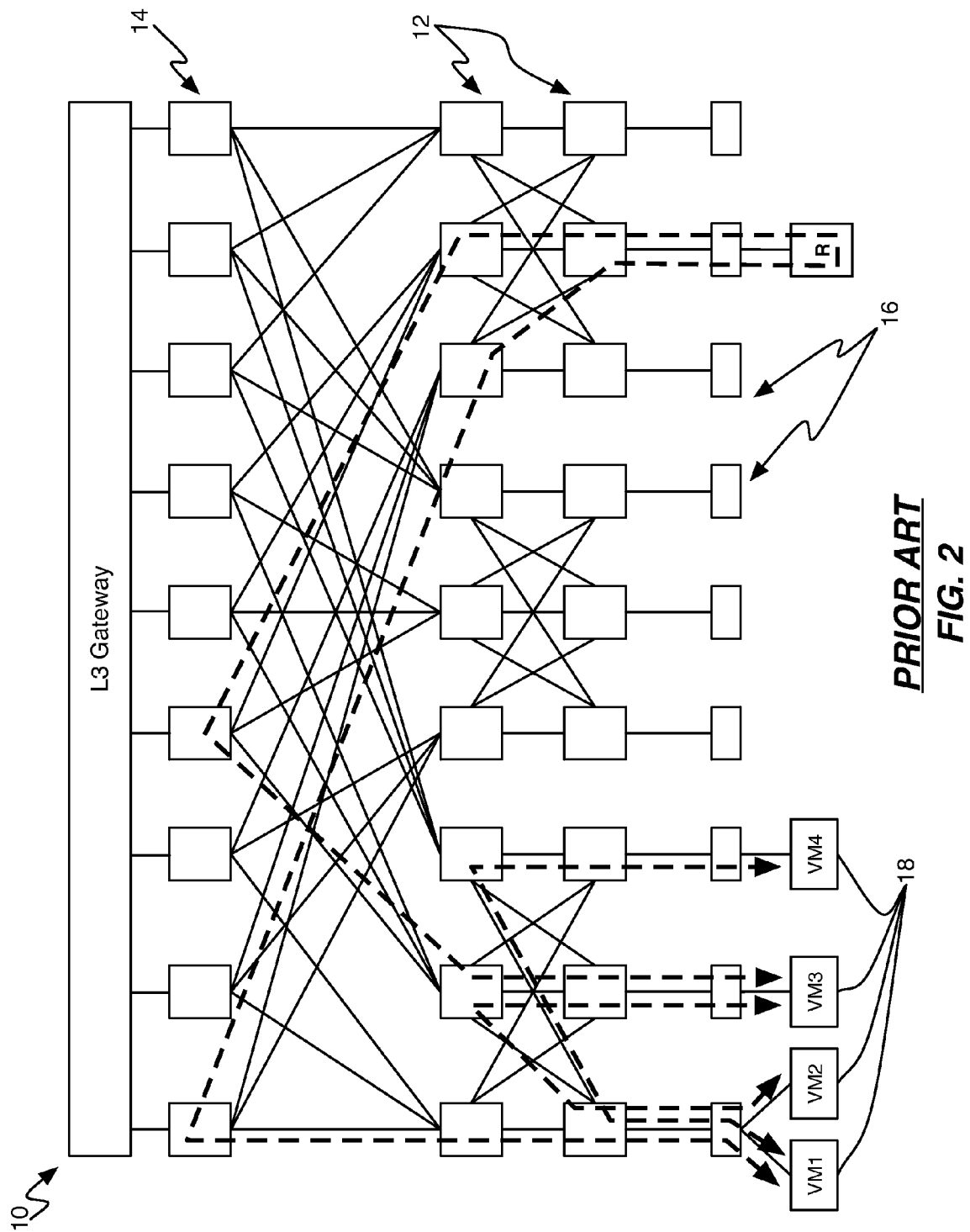
Figure 3:
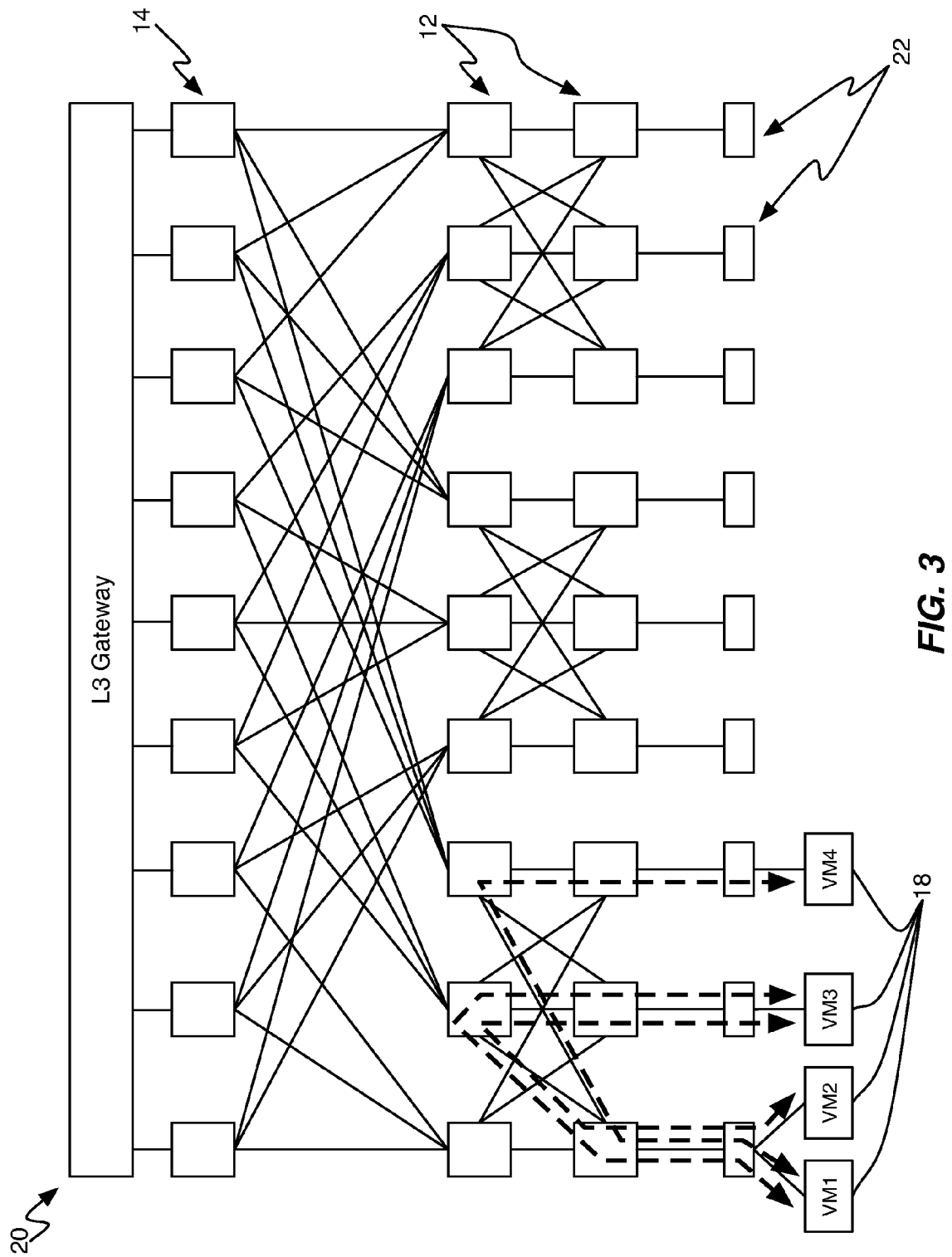
FIG. 3 is a diagram of one embodiment of L2-based inter-subnet packet exchanges, according to the teachings herein.

FIG. 3 illustrates an overall network 20 that includes L2 switches 12, L3 routers 14 at an L3 gateway level, and a number of servers 22 hosting any number of virtual machines or VMs 18. One or more of the servers 22 are configured according to the teachings herein, e.g., one or more of them implement a hypervisor that includes the advantageous L2 gateway entity described by way of example herein. Although such L2 gateway entities are not shown explicitly in the diagram, one sees that they provide for the efficient exchange of communications between VMs 18 that are in different subnets of the same logical network. As such communications flow between, e.g., VM1 and VM3, at the L2 level, even though those VMs 18 operate in different subnets.

Figure 4:
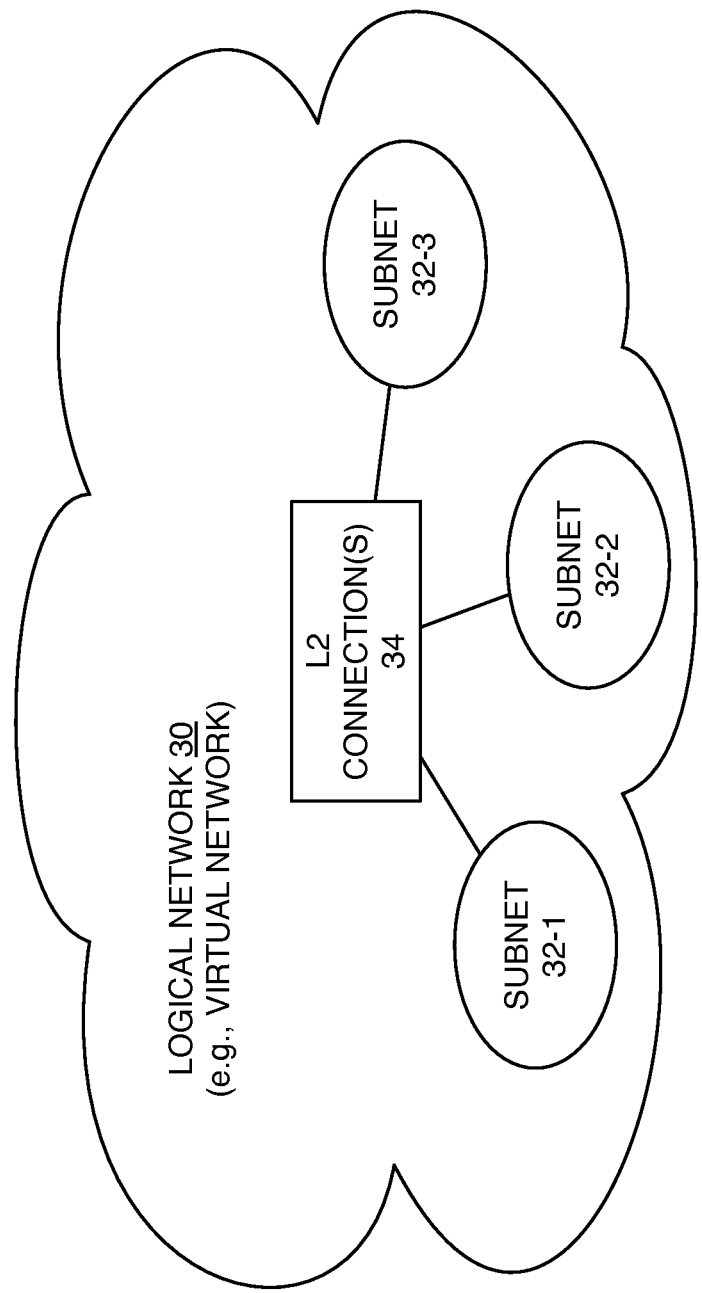
FIG. 4 is a block diagram of one embodiment of logical networks and corresponding L2-connected subnets.

The arrangement is more readily seen in FIG. 4, which provides a simplified illustration of a logical network 30, e.g., a virtual network implemented in a cloud-based system that provides network virtualization for a potentially large number of different tenants or organizations. The logical network 30 (hereafter "network 30") includes a number of different subnets, shown as subnets 32-1, 32-2, and 32-3 in the illustrated example. The different subnets 32 are interconnected by a L2 connection 34, which actually may comprise multiple L2 connections or links, and which may involve more than one L2 switch.

Figure 5:
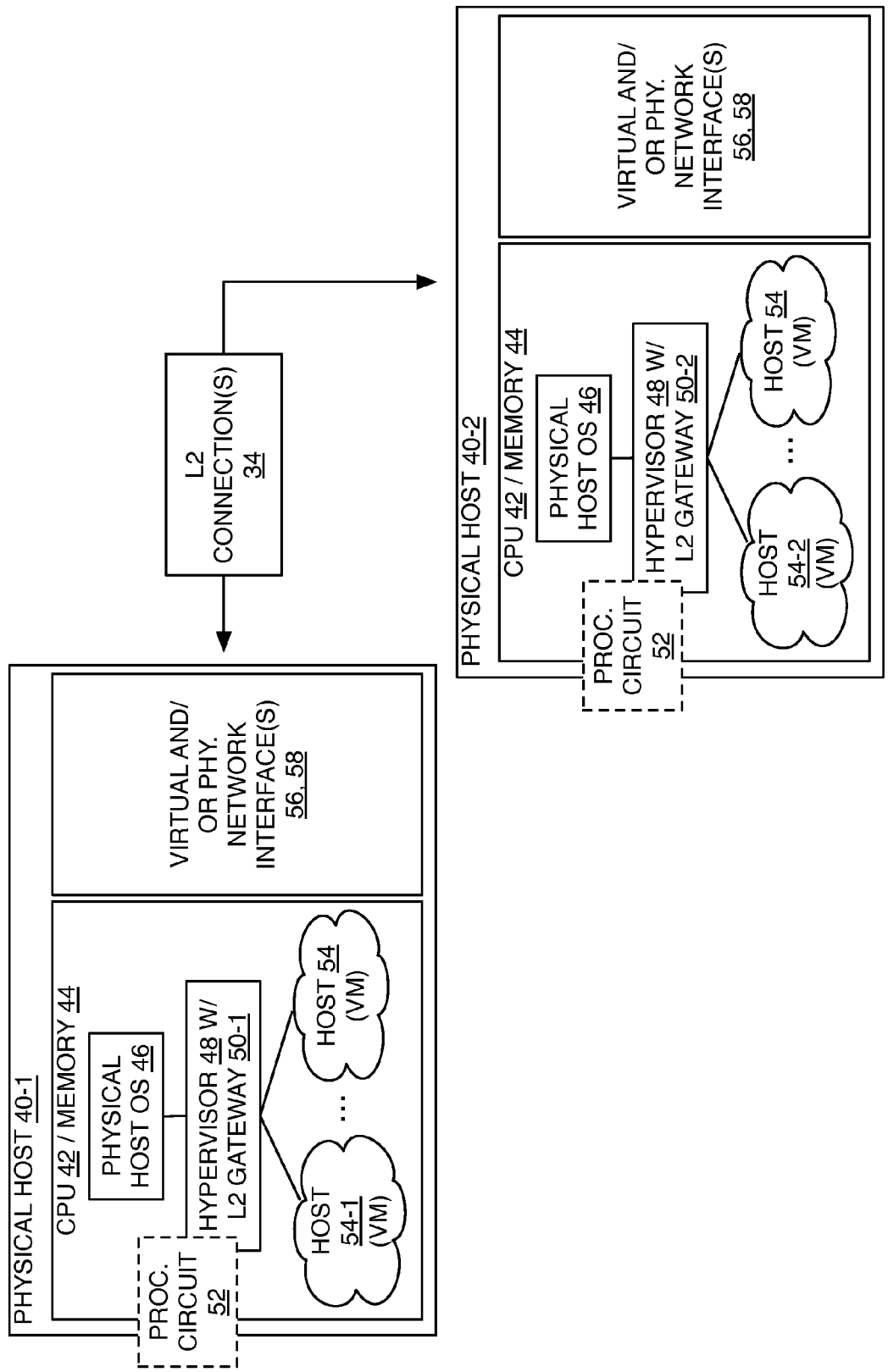
FIG. 5 is a block diagram of one embodiment of physical hosts that implement hypervisors having L2 gateways according to the teachings herein.

FIG. 5 provides further details regarding the example implementation presented here for discussion. In the diagram, one sees first and second physical hosts 40-1 and 40-2. Each physical host 40 may be understood as being one of the servers 22 shown in FIG. 3. Further each physical host 40 includes a CPU 42 and memory 44 in which multiple functional processing entities or structures are realized, including a physical host operating system (OS) 46 and an associated hypervisor 48 and L2 gateway 50. The L2 gateway 50 in each physical host 40 includes a processing circuit 52. When needed for clarity of discussion, the L2 gateway 50 in the first physical host 40-1 is referred as the L2 gateway 50-1 and the L2 gateway 50 in the second physical host 40-2 is referred to as the L2 gateway 50-2.

When suffixes are not needed for clarity, they are not used, and it should be understood that non-suffixed reference designators may be used for both singular and plural references herein, such as "L2 gateway 50" in the singular case and "L2 gateways 50" in the plural case, and so on. Further, it will be appreciated that these and other illustrated entities or components within the physical hosts 40 are functionally realized in the respective host CPUs 42/memories 44 (which may broadly contain volatile and non-volatile devices and may include disk or other storage) according at least in part to the execution of stored computer program instructions, e.g., host OS and lower level programs and routines, and additional OSs and/or further programs constituting the hosts 54 shown in the diagram.

The hosts 54 comprise VMs or guest machines operating in the virtualization environment provided by the respective hypervisor 48. In the illustrated example, the hypervisor 48 in the physical host 40-1 provides virtualization for a number of hosts 54, and the hypervisor 48 in the physical host 40-2 provides virtualization for a number of other hosts 54. The hosts 54 realized in the physical host 40-2 operate in a different subnet as compared to the hosts 54 realized in the physical host 40-1, although for purposes of this discussion, all of the hosts 54 illustrated in FIG. 5 are assumed to belong to the same tenant or organization.

For ease of discussion, one of the hosts 54 in the physical host 40-1 is particularly identified as host 54-1 and, likewise, one of the hosts 54 in the physical host 40-2 is particularly identified as host 54-2. This numbering provides a convenient basis for referencing communications as taught herein for two hosts 54 that are realized in different physical hosts 40 and that operate in different subnets 32 of the same logical network 30.

Figure 6A:
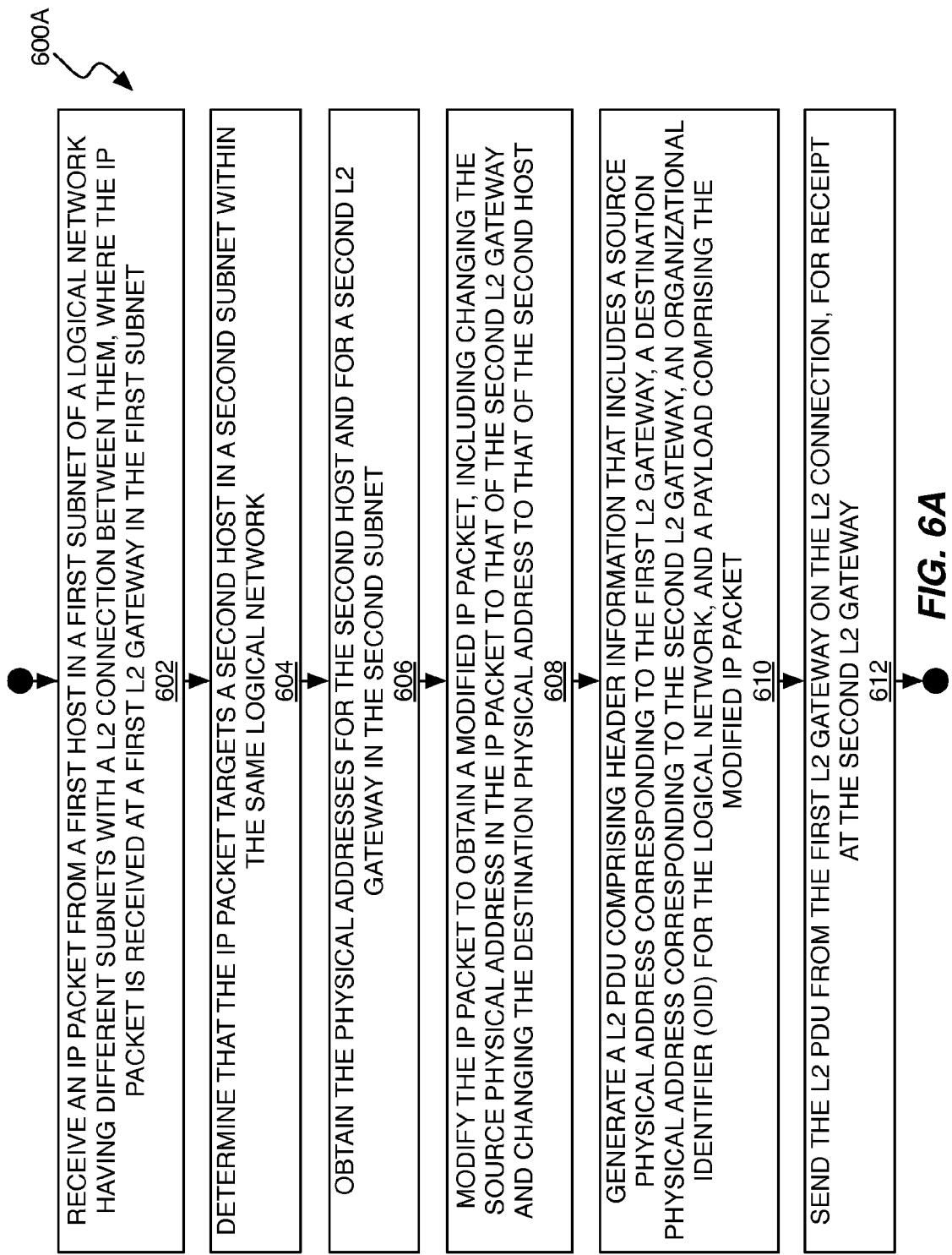
FIG. 6A is a logic flow diagram of one embodiment of a method of processing at an L2 gateway.

FIG. 6A illustrates a method 600 of exchanging IP packets between different subnets and is, for example, implemented via the L2 gateway 50-1 associated with the hypervisor 48 in the physical host 40-1. With reference to FIG. 6A and FIGS. 4 and 5, the method 600 includes receiving (Block 602) an IP packet from a first host 54-1 in a first subnet 32-1 of a logical network 30 having different subnets 32 with a L2 connection 34 between them. The IP packet is received at the first L2 gateway 50-1 in the first subnet 32-1.

The method 600 further includes determining (Block 604) at the first L2 gateway 50-1 that the IP packet targets a second host 54-2 in a second subnet 32-2 within the same logical network 30, and obtaining (Block 606) at the first L2 gateway 50-1 a physical address for a second L2 gateway 50-2 in the second subnet 32-2, and a physical address for the second host 54-2. As an example for Block 606 processing, a directory service query is sent to the IP address of a directory server. This address generally is configured globally for the cloud environment; however, it is possible to have multiple directory servers in a datacenter (e.g. one for a set of tenants). The query parameters are (VM2 IP address, Tenant ID). The response parameters are (physical location of VM2, VM2's subnet Virtual Gateway MAC address, VM2 MAC address).

Correspondingly, the method 600 includes modifying (Block 608) the IP packet at the first L2 gateway 50-1 to obtain a modified IP packet, including changing a source physical address in the IP packet from a physical address of the first host 54-1 to the physical address obtained for the second L2 gateway 50-2, and changing a destination physical address from a physical address of the first L2 gateway 50-1 to the physical address obtained for the second host 54-2.

Additionally, the method 600 includes generating (Block 610) a L2 protocol data unit (PDU) at the first L2 gateway 50-1. The PDU comprises header information that includes a source physical address corresponding to the first L2 gateway 50-1, a destination physical address corresponding to the second L2 gateway 50-2, an organizational identifier (OID) for the logical network 30, and a payload comprising the modified IP packet. As such, the method 600 continues with sending (Block 612) the PDU from the first L2 gateway 50-1 on the L2 connection 34, for receipt at the second L2 gateway 50-2.

In an example case, determining (Block 604) at the first L2 gateway 50-1 that the IP packet targets the second host 54-2 in the second subnet 32-2 includes detecting that a destination physical address included in the IP packet matches a physical address defined for the first L2 gateway 50-1. In this sense, the hosts 54 in the first subnet 32-1 may be configured to treat the first L2 gateway 50-1 as a default gateway in some sense and use a virtual address reserved for the L2 gateway when sending data to another host 54 in a different subnet 32.

Correspondingly, in at least one example of this arrangement, the L2 gateway 50-1 provides its physical address to the first host 54-1 responsive to receiving an Address Resolution Protocol (ARP) request from the first host 54-1. In particular, the first L2 gateway 50-1 is configured to respond to the ARP request by sending an ARP reply that includes the physical address defined for the first L2 gateway 50-1.

Any of the above examples regarding the method 600 may be based on the first and second hosts 54-1, 54-2 being first and second virtual machines (VMs), where the first and second subnets 34-1, 34-2 are first and second virtual subnets, and the logical network 30 comprises a virtual network that includes the first and second virtual subnets 32-1, 32-2. Further in this example arrangement, the first L2 gateway 50-1 is implemented in a first hypervisor 48 that virtualizes the first VM and runs on a first physical host 40-1, and the second L2 gateway 50-2 is implemented in a second hypervisor 48 that virtualizes the second VM and runs on a second physical host 40-2.

In a further extension or variation of the method 600, the OID for the logical network 30 is determined based on a port or connection through which the IP packet was received from the first host 54-1. As noted, the OID in at least some embodiments contemplated herein identifies a given tenant in a cloud-based environment that hosts virtual networks for any number of tenants, and the OID is operatively used in the advantageous exchanging of communications between hosts 54 that belong to the same tenant but operate in different subnets 32 of the logical network 30 that is virtualized in the cloud environment for that tenant.

In an example of the operations set forth in Block 606, the first L2 gateway 50-1 obtains the physical addresses for the second L2 gateway 50-2 and the second host 54-2 by obtaining directory service information from a localized directory table, if the localized directory table includes corresponding entries, and otherwise by sending a directory request that includes the OID and an IP address of the second host 54-2, as is known from the IP packet received from the first host 54-1, and correspondingly receiving a directory service response that indicates the physical addresses for the second L2 gateway 50-2 and the second host 54-2.

Figure 7:
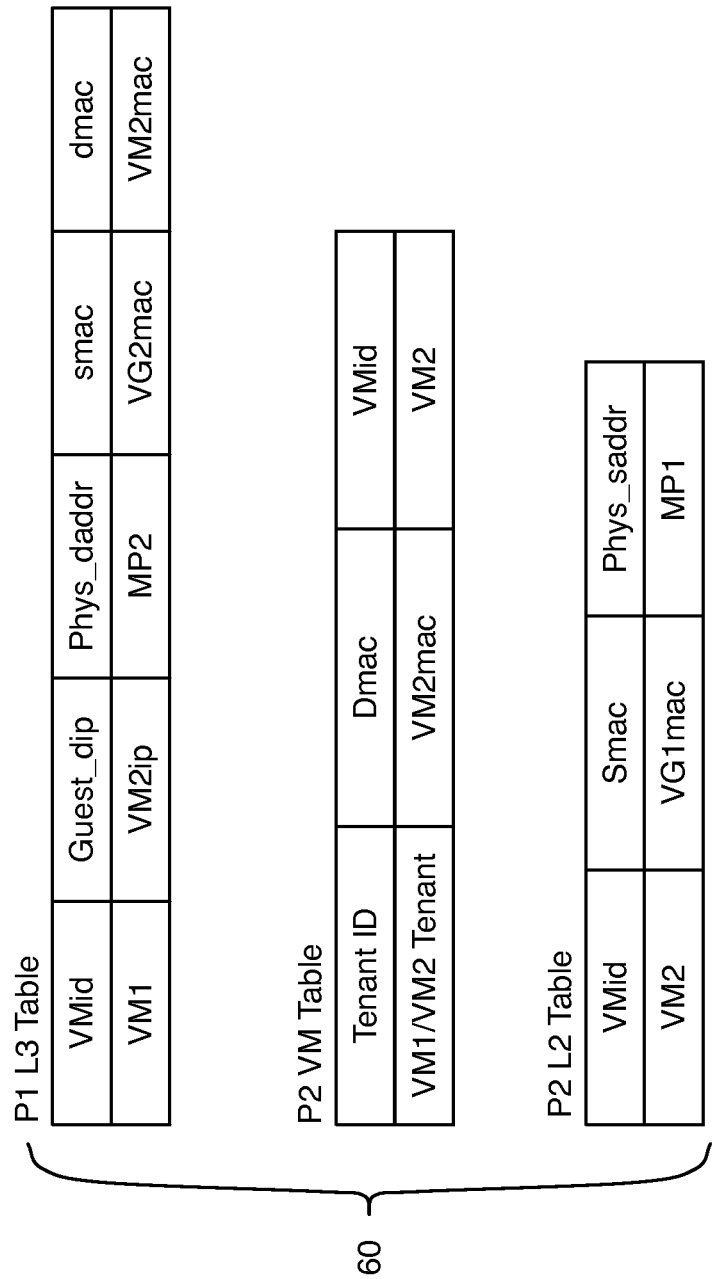
FIG. 7 is a diagram of a data structure for a distributed directory service used in some embodiments of the L2-based packet exchanges taught herein.

FIG. 7 illustrates an example directory table 60, which is localized in the sense that different parts of the table may be stored and maintained by different entities. For example, the first L2 gateway 50-1 associated with the hypervisor 48 in the physical host 40-1 may use the "P1 L3 Table" shown in FIG. 7, wherein VMid=the ID of the packet-originating VM, Guest_dip=the IP address of the destination VM, Phys_daddr=the physical address of the destination physical host 40, smac=the physical address of the destination L2 gateway 50, and dmac=the physical address of the destination VM 54.

In the same example, the second L2 gateway 50-2 may use the "P2 VM Table," where Tenant ID=the OID, Dmac=the physical address of the destination VM 54, and VMid=the ID of the destination VM 54. The second gateway 50-2 may further use the "P2 L2 Table," where VMid=the ID of the destination VM 54, Smac=the physical address of the source (packet-originating) VM 54, and MP1=the physical address of the second physical host 40-2.

Of course, the foregoing explanation of the distributed directory table 60 adopts the perspective of sending an IP packet from the first host 54-1 to the second host 54-2. Similar entries would be made/used for the case where the second host 54-2 is the originating or source host, and sends an IP packet to the first host 54-1. Thus, in a generalized embodiment, both L2 gateways 50-1 and 50-2 have the sending functionality shown by way of example in FIG. 6A and also have the complementary receiving functionality shown by way of further example in FIG. 6B. However, for consistency with the example of FIG. 6A wherein the first host 54-1 sent an IP packet for delivery to the second host 54-2, FIG. 6B describes receive-side processing at the second L2 host 54-2.

Figure 6B:
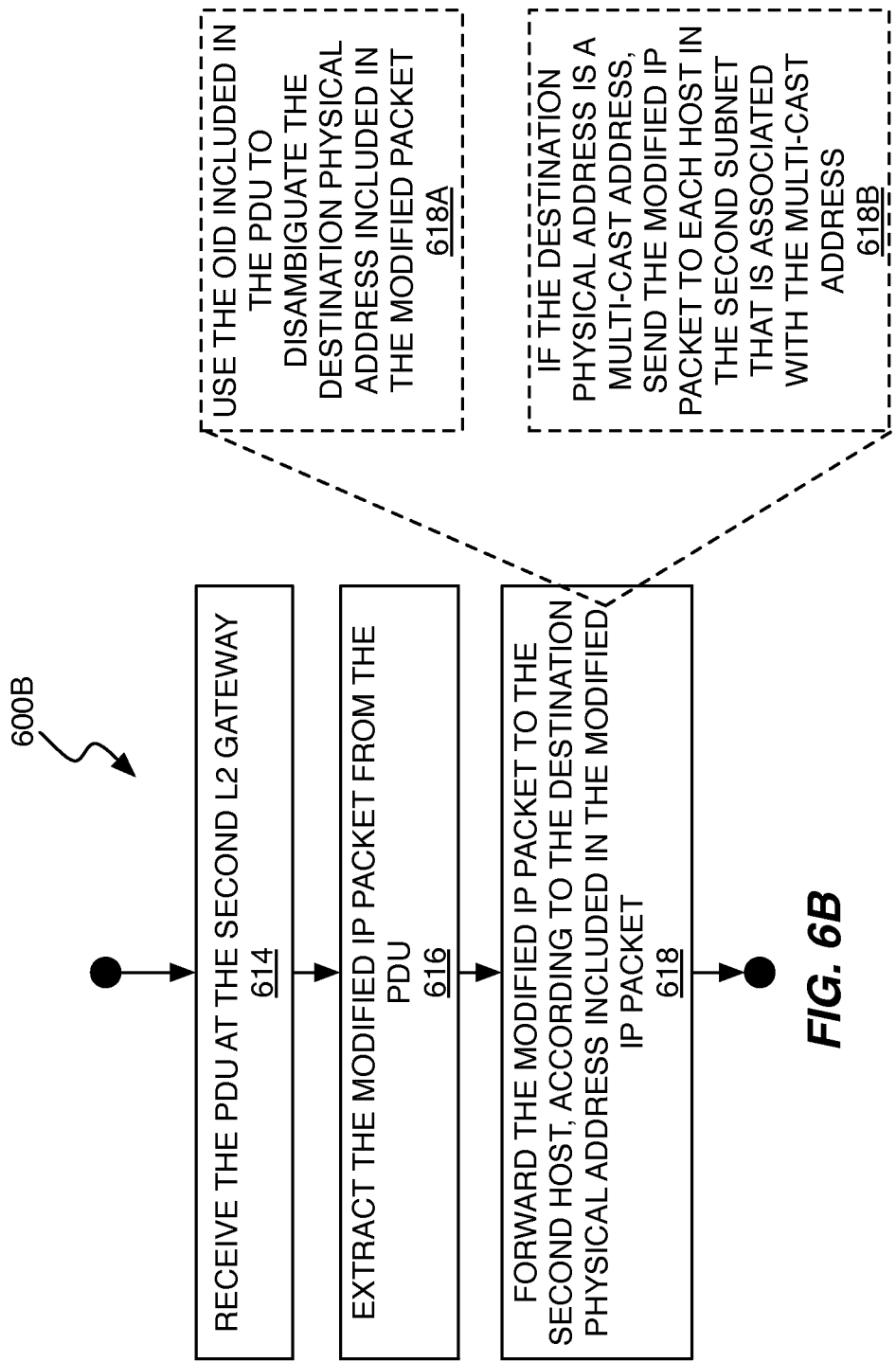
FIG. 6B is a logic flow diagram of one embodiment of a method of further processing at an L2 gateway.

The receive-side aspects of the method 600 shown in FIG. 6B include receiving (Block 614) the PDU at the second L2 gateway 50-2, extracting (Block 616) the modified IP packet from the PDU, and forwarding the modified IP packet to the second host 54-2, according to the destination physical address included in the modified IP packet. In performing these operations, the second L2 gateway 50-2 uses the OID included in the PDU to disambiguate the destination physical address included in the modified IP packet. Further, when the destination physical address is a multi-cast address, the second L2 gateway 50-2 sends the modified IP packet to each host 54 in the second subnet 32-2 that is associated with the multi-cast address.

As mentioned earlier, the L2 gateways 50-1 may be implemented as functional entities in association with their respective hypervisors 48 and physical hosts 40. With that in mind and referring back to FIG. 4, the first L2 gateway 50-1 includes a first interface 56 that is configured for data communications in a first subnet 32-1 of a logical network 30 having different subnets 32 with a L2 connection between them. The first interface 56 may be realized functionally within the hypervisor 48, and will be understood in one example as a processing circuit arrangement implementing the appropriate protocol and interface functionality, e.g., Ethernet.

The first L2 gateway 50-1 further includes a second interface 58 that is configured for data communications via the L2 connection with a second L2 gateway 50-2 in a second subnet 32-2 of the logical network. In an example case, the second interface 58 is configured for exchanging L2 PDUs with other L2 gateways 50 via the L2 connection 34 shown in FIG. 4.

The first L2 gateway 50-1 further includes a processing circuit 52, which again may be realized programmatically within the processing resources (one or more CPUs or other digital processing circuits) comprising the hypervisor 48/physical host 40-1. The processing circuit 52 is operatively associated with the first and second interfaces 56, 58 and is configured to: receive an IP packet from the first host 54-1; determine that the IP packet targets a second host 54-2 in a second subnet 32-2 within the same logical network; obtain a physical address for a second L2 gateway 50-2 in the second subnet 32-2, and a physical address for the second host 54-2; modify the IP packet to obtain a modified IP packet, including changing a source physical address in the IP packet from a physical address of the first host 54-1 to the physical address obtained for the second L2 gateway 50-2, and changing a destination physical address from a physical address of the first L2 gateway 50-1 to the physical address obtained for the second host 54-2; generate a L2 protocol data unit (PDU) at said first L2 gateway 50-1, comprising header information that includes a source physical address corresponding to the first L2 gateway 50-1, a destination physical address corresponding to the second L2 gateway 50-2, an OID for the logical network 30, and a payload comprising the modified IP packet; and send the PDU from the first L2 gateway 50-1 on the L2 connection, for receipt at the second L2 gateway 50-2.

The same packet-originating functionality also may be implemented at the second L2 gateway 50-2, with respect to the L2 gateway 50-1 or any other interconnected, like L2 gateway 50. More broadly, the first L2 gateway 50-1 may send PDUs to the second L2 gateway 50-2 according to the operations shown in FIG. 6A, or according to extensions or variations thereof. The same is true for the second L2 gateway 50-2 with respect to sending PDUs to the first L2 gateway 50-1, e.g., where the second host 54-2 originates IP packets targeting the first host 54-1.

Likewise, the packet-receiving functionality (the receive-side operations) described herein, e.g., by way of the example given in FIG. 6B, may be performed at the second L2 gateway 50-2 with respect to the first L2 gateway 50-1 Likewise, the receive-side operations may be performed at the first L2 gateway 50-1 with respect to PDUs sent from the second L2 gateway 50-2. In an example of receive-side processing taken in that direction, the processing circuit 52 in the first L2 gateway 50-1 is further configured to receive a second PDU from the second L2 gateway 50-2, where the second PDU includes a second modified IP packet corresponding to an IP packet targeting the first host 54-1 and sent from the second host 54-2.

Here, the term "second" as applied to the PDU received at the first L2 gateway 50-1 from the second L2 gateway 50-2, and as applied to the modified IP packet in that received PDU, is simply a label for clear distinction with the PDU and modified IP packet discussed in the context of FIG. 6A. Thus, it will be understood that the header information in the second PDU includes a source physical address corresponding to the second L2 gateway 50-2, a destination physical address corresponding to the first L2 gateway 50-1, the OID for the logical network 30, and a payload comprising the second modified PDU (which was generated by the second L2 gateway 50-2 in the same manner as was discussed for the first L2 gateway 50-1 in the context of FIG. 6A). In turn, the processing circuit 52 in the first L2 gateway 50-1 is configured to extract the second modified IP packet from the second PDU, and to forward the second modified IP packet to the first host 54-1, according to the destination physical address included in the second modified IP packet.

In the above context, the processing circuit 52 may be configured to use the OID included in the second PDU to disambiguate the destination physical address included in the second modified IP packet. Further, at least for the case where the destination physical address in the second modified IP packet is a multi-cast address, the processing circuit 52 is configured to send the second modified IP packet to each host 54 in the first subnet 32-1 that is associated with the multi-cast address. All such processing may also be performed by the processing circuit 52 in the L2 gateway 50-2, with respect to PDUs received from the first L2 gateway 50-1, and generally for any like-configured L2 gateway 50 in the logical network 30.

Thus, the L2 gateways 50 address the virtual subnet routing problem with an integrated L2 and L3 switching architecture that may use, e.g., some form of tunneling between the physical hosts 40. Such tunneling may be implemented, e.g., a L2 or L3 network overlay such as SPB or VxLAN. However, rather than solely using the destination virtual L2 address to determine the destination physical host 40, the method taught herein uses a combination of the virtual L2 and L3 addresses, depending on whether the IP packet targets a different subnet or not. To support such L3 forwarding, the routing between subnets 32 is flattened out and distributed into the physical hosts 40. With this approach, the teachings herein provide point to point communication between all the VMs belonging to a given tenant in a cloud hosting environment, without using any intermediate routing functions (VRFs or software routers) and while still providing full virtualization at L2 and L3 levels (i.e., completely isolated address spaces for each tenant at both L2 and L3 and support for multiple subnets).

As a further note, while several examples focus on the physical hosts 40, at least some of the same functionality could be implemented in the Top-of-Rack (ToR) L2 switches. That approach might be particularly desirable in the case where some number of the tenants wanted to keep at least some of their functions non-virtualized.

In any case, in an example case, the inter-subnet communications taught herein may be regarded as having two top-level functions or components: a "forwarding function" and a "directory service." The forwarding function runs on each physical host 40—e.g., as implemented via the hypervisor 48 and L2 gateway 50—and is responsible for transmitting/receiving packets from/to VMs or other hosts 54 realized within the physical hosts 40.

In complementary fashion, the contemplated directory service—e.g., as represented by way of example in the distributed table 60 illustrated in FIG. 7—keeps track of the physical location of every host 54 and is responsible for answering queries to map virtual and physical addresses, and for sending invalidation messages to the appropriate physical hosts 40 whenever (virtual) hosts 54 are migrated. The directory service also maintains information regarding the virtual networks topologies. It transforms the topologies into a flat point-to-point table that is used for L3 lookups. The directory service is also responsible for configuring the forwarding function (e.g., L2 gateway information, multicast memberships, etc.). The directory service preferably is distributed for scalability and availability reasons but it appears as a single logical instance.

As noted earlier, one or more embodiments of the teachings herein assume the presence of a network overlay between the physical hosts 40, which overlay encapsulates the traffic from the hosts 54, which are virtualized in the respective physical hosts 40. The virtual addresses at both L2 and L3 levels are not exposed to the physical network. Once encapsulated, the traffic is forwarded in the physical network solely based on the physical destination address. That address could be an L2 address with an L2 overlay or an L3 address with a L3 overlay. The technique also exploits the availability of multicast in the underlying physical network to transmit packets to all physical hosts 40 running hosts 54 belonging to the same virtual subnet 32. Further, as noted several times, the teachings herein use a tenant ID—e.g., the OID described earlier—for disambiguation, where the tenant ID uniquely identifies a tenant among a number of tenants and their respective logical networks 30. Both SPB and VxLAN support all such functionality.

In looking at the packet forwarding function contemplated herein in more detail, the L2 gateway 50 or other appropriately configured entity associated with the respective hypervisor 48 in a given physical host 40 provides forwarding as needed for the IP packets originating from hosts 54 realized within the physical host 40. These hosts 54 are sometimes referred to as "guest machines" and the traffic at issue therefore is sometimes referred to as "guest traffic." The L2 gateway 50 determines the destination physical host 40 based on either the virtual destination Medium Access Control (MAC or mac) address or the destination virtual IP address—i.e., the IP address of the target host 54.

The L2 gateway 50 then encapsulates and sends the IP packets accordingly. In an example implementation, the forwarding operation uses two tables: an L2 table, and an L3 table. Both tables may be parts of the distributed table 60 shown in FIG. 7 and they are indexed by virtual machine (VM) ID in addition to the primary key (such as destination IP address) to disambiguate between potentially overlapping virtual addresses. Here, a VM ID will be understood as uniquely identifying a given host 54 realized within a physical host 40.

The L2 table provides a mapping between a virtual mac address and a physical host address. This table is used to find the physical host 40 running hosts 54 (also simply referred to as VMs) that are located in the same virtual subnet. The keys are the local VM ID and the virtual destination mac address. The table is automatically filled using the virtual source mac address of incoming packets from the local virtual subnet and from requests to the directory service.

The L3 table provides a mapping between a virtual IP address and physical host address. This table is used to find the physical host 40 for hosts 54 located on different virtual subnets. The keys are the VM ID and the virtual destination IP address and the table stores a 3-tuple of the destination physical address, the source mac of the L2 gateway 50 on the receiving side, and the mac address of the destination host 54. This information is necessary to properly emulate the behavior of a router. The L3 table is only filled using information from the directory service to ensure that the directory service has a precise knowledge of which physical hosts 40 have specific mappings in their L3 table and can send invalidation messages only to those physical hosts 40.

To transmit an IP packet originated from a given local host 54, the forwarding function realized in the corresponding local L2 gateway 50 first determines if the IP packet is destined to the local subnet 32 or not. If the virtual destination mac address corresponds to the address of the local L2 gateway 50, then the IP packet is detected as not being destined locally and should be routed (i.e., forwarded using its destination IP address). The mac address for the L2 gateway 50 in this regard is configured by the directory service based on the virtual network topologies. Reserving or defining a virtual default gateway address for the L2 gateway 50 simulates the presence of a router, at least from the perspective of the hosts 54.

To forward a packet at the L3 layer, the forwarding function determines the destination physical address from the L3 table using the destination IP address in the outgoing packet. In the case of a miss, the information is requested from the directory service and inserted in the table. Before being forwarded, the source and destination mac addresses are rewritten in the IP packet, so that the packet appears to have been transmitted by the destination L2 gateway 50. The source and destination mac addresses are also stored in the L3 table along with the destination physical address. Once the physical destination address is determined and the mac addresses have been updated, the packet is encapsulated with a physical header (either L2 or L3 depending on the underlying physical network) and transmitted—see the packet modification and PDU-based encapsulation operations in FIG. 6A.

For local unicast packets, the destination physical address is looked up in the L2 table. In the case of a miss, the information is requested from the directory service and inserted in the table. The packet is then encapsulated with a physical header and transmitted. Broadcast packets are multicasted to all physical hosts 40 running hosts 54 on the virtual subnet 32, except for one type of packets: ARP request for the mac address of the L2 gateways 50. These ARP request are handled locally by the respective L2 gateway 50—i.e., the local forwarding function crafts an ARP response and sends it directly to the local host 54 that originated the ARP request.

Consider the following example transmission algorithm that may be implemented by a given L2 gateway 50-1 within a given hypervisor 48 and corresponding physical host 40-1. It will be understood that the transmission is done with respect to an IP packet outgoing from a host 54 that is local to the L2 gateway 50-1—e.g., a host 54-1 at the physical host 40-1 transmits an IP packet that targets a host 54-2 at another physical host 40-2, where the host 54-2 is in a different subnet 32 than the host 54-1 but is affiliated with the same tenant and is in the same logical network 30.

With these qualifications in mind, pseudo-code for the example packet transmission algorithm is given below, where use of the terms "guest," "VM," and "VMid" refer to the source host 54-1 or to the destination host 54-2, depending on indicated source or destination attributes:

```
Transmit (phys_saddr, VMid, Tid, packet):
  Store destination MAC address from packet in guest_dmac;
  if guest_dmac is a L2 gateway interface
  {
    Store destination IP address from packet in guest_dip;
    Lookup L3 table with VMid and guest_dip yielding phys_daddr,
        smac, dmac;
    if the Lookup failed
    {
      Lookup the physical location of VM with L3 key using Tid and
          guest_dip yielding phys_daddr, smac, dmac;
      Add an entry with VMid, guest_dip, phys_daddr, smac, dmac to
          the L3 table;
    }
    Set the Ethernet destination address of packet to dmac;
    Set the Ethernet source address of packet to smac;
    Encapsulate_and_send (phys_saddr, phys_daddr, Tid, packet);
  }
  elseif (guest_dmac is a broadcast address)
  {
    if packet is arp request for a virtual gateway
    {
      Emulate_arp_response_from_router(VMid, packet);
    }
    else
    {
      Set the phys_daddr to be the Broadcast emulation
          Multicast group for VMid;
      Encapsulate_and_send (phys_saddr, phys_daddr, Tid, packet);
    }
  }
  else
  {
    Lookup the L2 table with VMid, guest_dmac yielding phys_daddr;
    if the Lookup failed
    {
      Lookup the physical location of VM with L2 key using Tid and
          guest_dmac yielding phys_daddr;
      Add an entry with VMid, guest_dmac, phys_daddr to the L2
          table;
    }
    Encapsulate_and_send (phys_saddr, phys_daddr, Tid, packet);
  }
```

An example corresponding reception algorithm at the destination L2 gateway 50-2 is given in pseudo code as:

```
Receive (phys_saddr, phys_daddr, Tid, packet):
  if phys_daddr is a multicast address
  {
    for each VMid that is a recipient for this multicast address
    {
      Add an entry with VMid, <packet_source_mac>,
          phys_saddr to the L2 table;
      Send the packet to the VM identified by VMid;
    }
  }
  else
  {
    Lookup target using Tid, <packet_dest_mac> yielding VMid;
    Add an entry with VMid, <packet_source_mac>,
        phys_saddr to the L2 table;
    Send the packet to the VM identified by VMid;
  }
```

In a further example, consider VM1 and VM2 as representing different hosts 54 running on different subnets 32 in the same logical network 30, where VM1 has a corresponding L2 gateway 50 operating in its subnet 32 and, likewise, VM2 has a corresponding L2 gateway 50 operating in its subnet 32. The corresponding physical hosts 40-1 (hosting VM1) and 40-2 (hosting VM2) are denoted as P1 and P2. Thus, VM1 and VM2 are on different subnets 32 and communicate with each other. VM1 runs on P1 and VM2 runs on P2. VG1{mac, ip} is the interface of VM1's L2 gateway 50 and VG2{mac, ip} is the interface of VM2's L2 gateway 50.

With that notation in mind and recognizing that functions attributed to P1 or P2 may be performed by the respective L2 gateway 50, a stepwise transmission example is given as:

Step 1: VM1 sends an ARP request: {smac=VM1mac, dmac=bcast, who has VG1$ip$}.

Step 2: P1 discovers this is an ARP request for VG1ip address by inspecting the ARP request body. P1 crafts an ARP reply: {smac=VG1mac, dmac=VM1mac, I am VG1ip} and sends it to VM1.

Step 3: VM1 sends an IP packet destined to VM2: {smac=VM1mac, dmac=VG1mac, sip=VM1ip, dip=VM2ip}.

Step 4: P1 sends a request to the discovery service for the physical location of VM2$ip$ using the Tenant ID of VM1 (same as that of VM2).

Step 5: The discovery service replies with the physical location of VM2, the mac address of the virtual gateway interface for VM2's subnet, and the mac address of VM2. P1 inserts this information in its L3 table: VM2ip→(MP2, VG2mac, VM2mac). The discovery service also keeps track of who has received L3 forwarding information to facilitate entry invalidation when the VM migrates.

Step 6: P1 rewrites the ethernet header of the IP packet destined to VM2:{smac=VG2mac, dmac=VM2mac, sip=VM1ip, dip=VM2ip}, encapsulates the packet with physical header: {Source Mac=MP1, Dest mac=MP2} and sends it to P2.

Step 7: P2 receives the packet, decapsulates it and forwards it to VM2 based on the destination mac. (The tenant ID is used to disambiguate between potentially overlapping mac addresses).

Step 8: VM2 replies in a matter similar to the communication from VM1 except that it does not need to do an ARP request.

Step 9: Steps 4-7 are performed in the reverse direction (i.e. from VM2/P2 to VM1/P1).

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of exchanging Internet Protocol (IP) packets between different subnets comprising:

receiving an IP packet from a first host in a first subnet of a logical network having different subnets with a L2 connection between them, said IP packet received at a first L2 gateway in the first subnet;

determining at said first L2 gateway that the IP packet targets a second host in a second subnet within the same logical network;

obtaining at said first L2 gateway a physical address for a second L2 gateway in the second subnet, and a physical address for the second host;

modifying the IP packet at said first L2 gateway to obtain a modified IP packet, including changing a source physical address in the IP packet from a physical address of the first host to the physical address obtained for the second L2 gateway, and changing a destination physical address from a physical address of the first L2 gateway to the physical address obtained for the second host;

generating a L2 protocol data unit (PDU) at said first L2 gateway, comprising header information that includes a source physical address corresponding to the first L2 gateway, a destination physical address corresponding to the second L2 gateway, an organizational identifier (OID) for the logical network, and a payload comprising the modified IP packet; and sending the PDU from the first L2 gateway on the L2 connection, for receipt at the second L2 gateway.

2. The method of claim 1, wherein determining at said first L2 gateway that the IP packet targets the second host in the second subnet includes detecting that a destination physical address included in the IP packet matches a physical address defined for the first L2 gateway.

3. The method of claim 2, further comprising providing the physical address of the first L2 gateway to the first host responsive to receiving an Address Resolution Protocol (ARP) request from the first host, including responding to the ARP request by sending an ARP reply that includes the physical address defined for the first L2 gateway.

4. The method of claim 1, wherein the first and second hosts are first and second virtual machines (VMs), the first and second subnets are first and second virtual subnets, and the logical network comprises a virtual network that includes the first and second virtual subnets, and further wherein the first L2 gateway is implemented in a first hypervisor that virtualizes the first VM and runs on a first physical host, and the second L2 gateway is implemented in a second hypervisor that virtualizes the second VM and runs on a second physical host.

5. The method of claim 1, further comprising determining the OID based on a port or connection through which the IP packet was received from the first host.

6. The method of claim 1, wherein obtaining the physical addresses for the second L2 gateway and the second host comprises obtaining directory service information from a localized directory table, if the localized directory table includes corresponding entries, and otherwise by sending a directory request that includes the OID and an IP address of the second host, as is known from the IP packet received from the first host, and correspondingly receiving a directory service response that indicates the physical addresses for the second L2 gateway and the second host.

7. The method of claim 1, further comprising receiving the PDU at the second L2 gateway, extracting the modified IP packet from the PDU, and forwarding the modified IP packet to the second host, according to the destination physical address included in the modified IP packet.

8. The method of claim 7, further comprising using the OID included in the PDU to disambiguate the destination physical address included in the modified IP packet.

9. The method of claim 7, further comprising, when the destination physical address is a multi-cast address, sending the modified IP packet to each host in the second subnet that is associated with the multi-cast address.

10. A first Layer 2 (L2) gateway comprising:
a first interface configured for data communications in a first subnet of a logical network having different subnets with a L2 connection between them;
a second interface configured for data communications via the L2 connection with a second L2 gateway in a second subnet of the logical network; and
a processing circuit that is operatively associated with the first and second interfaces and is configured to:
receive an IP packet from the first host;
determine that the IP packet targets a second host in a second subnet within the same logical network;
obtain a physical address for a second L2 gateway in the second subnet, and a physical address for the second host;
modify the IP packet to obtain a modified IP packet, including changing a source physical address in the IP packet from a physical address of the first host to the physical address obtained for the second L2 gateway, and changing a destination physical address from a physical address of the first L2 gateway to the physical address obtained for the second host;
generate a L2 protocol data unit (PDU) at said first L2 gateway, comprising header information that includes a source physical address corresponding to the first L2 gateway, a destination physical address corresponding to the second L2 gateway, an organizational identifier (OID) for the logical network, and a payload comprising the modified IP packet; and
send the PDU from the first L2 gateway on the L2 connection, for receipt at the second L2 gateway.

11. The L2 gateway of claim 10, wherein the L2 gateway comprises a functional entity within a physical host.

12. The L2 gateway of claim 10, wherein the processing circuit is configured to:
receive a second PDU from the second L2 gateway, where the second PDU includes a second modified IP packet corresponding to an IP packet targeting the first host and sent from the second host, and where the second PDU comprises header information that includes a source physical address corresponding to the second L2 gateway, a destination physical address corresponding to the first L2 gateway, the OID for the logical network, and a payload comprising the second modified PDU;
extract the second modified IP packet from the second PDU; and
forward the second modified IP packet to the first host, according to the destination physical address included in the second modified IP packet.

13. The first L2 gateway of claim 12, wherein the processing circuit is configured to use the OID included in the second PDU to disambiguate the destination physical address included in the second modified IP packet.

14. The L2 gateway of claim 12, wherein, when the destination physical address in the second modified IP packet is a multi-cast address, the processing circuit is configured to send the second modified IP packet to each host in the first subnet that is associated with the multi-cast address.

* * * * *